US012785848B2

(12) United States Patent
Venkataraman et al.

(10) Patent No.: US 12,785,848 B2
(45) Date of Patent: Nov. 3, 2026

(54) METHOD AND APPARATUS FOR FORWARD ERROR CORRECTION AT THE IP LAYER WITH LOSS ADAPTIVE OVERHEAD MINIMIZATION

(71) Applicant: CradlePoint, Inc., Boise, ID (US)

(72) Inventors: Natarajan Venkataraman, Bangalore (IN); Prashant Pai, Los Gatos, CA (US); Deepak Nair, San Jose, CA (US)

(73) Assignee: Cradlepoint, Inc., Boise, ID (US)

( * ) Notice: Subject to any disclaimer, the term of this patent is extended or adjusted under 35 U.S.C. 154(b) by 873 days.

(21) Appl. No.: 17/931,350

(22) Filed: Sep. 12, 2022

(65) Prior Publication Data

US 2024/0089027 A1 Mar. 14, 2024

(51) Int. Cl.
*H04L 1/00* (2006.01)

(52) U.S. Cl.
CPC .......... *H04L 1/0041* (2013.01); *H04L 1/0017* (2013.01); *H04L 1/0045* (2013.01)

(58) Field of Classification Search
CPC ... H04L 1/0041; H04L 1/0017; H04L 1/0045; H04L 1/0009; H04L 1/0025
See application file for complete search history.

(56) References Cited

U.S. PATENT DOCUMENTS 10,057,006 B2 * 8/2018 Hong .................... H04H 20/30
2009/0067551 A1 * 3/2009 Chen .................... H04L 1/004 375/340
2010/0050057 A1 * 2/2010 Luby .................... H04L 1/0083 714/776
2014/0286440 A1 * 9/2014 Apte .................... H04L 1/0011 375/240.27
2014/0304570 A1 * 10/2014 Baek .................... H04L 1/0075 714/752

OTHER PUBLICATIONS

M. Watson et al. "Forward Error Correction (FEC) Building Block", RFC 5051, Aug. 2007. Copyright (C) The IETF Trust (2007). Section 6.3, 7.0. (Year: 2007).*

* cited by examiner

*Primary Examiner* — Tonia L Dollinger
(74) *Attorney, Agent, or Firm* — Parsons Behle & Latimer

(57) ABSTRACT

Computer-implemented systems and methods for Forward Error Correction (FEC) at the IP-Layer with adaptive bandwidth overhead minimization in a packet transmission network, the system including an FEC encoder to process IP packets and generate FEC encoded packets and repair packets, an FEC decoder to receive and process the FEC encoded packets and repair packets, and an FEC controller that includes a set of computer-implemented instructions to carry out functions including configuring an FEC algorithm to control FEC encoding and decoding, packet recovery, and retrieve packet transmission statistics, determining if network bandwidth overhead needs adjustment, controlling tuning parameters, and implementing predictive analysis based at least in part on historic data.

22 Claims, 3 Drawing Sheets

METHOD AND APPARATUS FOR FORWARD ERROR CORRECTION AT THE IP LAYER WITH LOSS ADAPTIVE OVERHEAD MINIMIZATION

FIELD OF THE DISCLOSURE

This disclosure relates generally to systems and methods for handling network packet losses with adaptive bandwidth overhead minimization. More particularly, this disclosure relates to systems and methods for Forward Error Correction (FEC) at the IP-layer with adaptive bandwidth overhead minimization.

BACKGROUND

Mobile broadband based Internet access is prone to lossy packet transfer due to environmental factors as well as the continually varying distance between the user and cell tower. Packet loss negatively affects the user experience of applications running on their mobile device. Quality of Experience (QoE) is typically an important factor in user satisfaction. In cases of TCP based applications, packet loss can result in TCP congestion control being invoked and further reducing the bandwidth used. This manifests to the user as a perception of "slow application" performance.

Further, for real-time communication such as voice/video conferencing, packet loss results in poor media quality and user dissatisfaction. Forward error correction (FEC) is a known technique whereby additional packets, called repair packets, are added to the traffic stream, which helps in recovering any packet loss. Due to this the use of FEC does result in increased network bandwidth overhead. Typically, there are two scenarios with FEC. In one case packet loss is low and the addition of too many repair packets can result in excessive network bandwidth overhead, which increases the transmission costs while reducing the available bandwidth. In the second case, there may be too few repair packets which, when facing a larger packet loss percentage, can result in an inability to recover packets, defeating the purpose of using FEC.

Other drawbacks, inefficiencies, and issues exist with current systems and methods.

SUMMARY

Accordingly, disclosed embodiments address the above-noted, and other, drawbacks, inefficiencies, and issues of existing systems and methods.

Disclosed embodiments incorporate ways to dynamically change the number of repair packets generated by an FEC algorithm and/or the number of original packets which constitute a block, based on actively measuring packet loss over a timeframe. Further disclosed embodiments include ways to reduce synchronization between the FEC sending side and FEC receiving side, making the FEC receiving side being able to automatically adjust to variations in number of repair packets generated.

Further disclosed embodiments include computer-implemented systems for FEC at the IP-Layer with adaptive bandwidth overhead minimization in a packet transmission network, the system including an FEC encoder to process IP packets and generate FEC encoded packets and repair packets, an FEC decoder to receive and process the FEC encoded packets and repair packets, and an FEC controller that includes a set of computer-implemented instructions to cause a processor to carry out functions including configuring an FEC algorithm to control FEC encoding and decoding, packet recovery, and retrieve packet transmission statistics, determining if network bandwidth overhead needs adjustment, controlling tuning parameters, and implementing predictive analysis based at least in part on historic data.

In some embodiments the FEC encoder adds meta-information to the FEC encoded packets. In some embodiments the FEC encoder uses an encoding context provided by the FEC controller. In some embodiments the FEC decoder uses a decoding context provided by the FEC controller. In some embodiments the FEC encoder maintains an encoding state for processing the IP-packets. In some embodiments the FEC decoder maintains a decoding state for processing the IP-packets.

In some embodiments the FEC controller controls tuning parameters that include: (i) the number of original IP packets, (ii) the number of generated repair packets, and (iii) the on/off state of the FEC algorithm.

In some embodiments the FEC encoder generates the FEC encoded packets to include an FEC block of predetermined length. In some embodiments the FEC encoder generates a predetermined number of repair packets per FEC block.

In some embodiments the FEC encoder sends an FEC block length and the number of repair packets per FEC block via an FEC trailer. In some embodiments the FEC encoder sends an FEC block length and the number of repair packets per FEC block via a port in a UDP header.

Also disclosed are computer-implemented systems for FEC at the IP-Layer, the system including an FEC encoder to process IP packets and generate FEC repair packets and FEC encoded packets that further include an FEC trailer, an FEC decoder to receive and process the FEC encoded packets and FEC repair packets, and an FEC controller that controls an FEC algorithm for the FEC encoder and FEC decoder.

In some embodiments the FEC trailer further includes a MAGIC #that indicates whether a particular packet is an FEC encoded packet or an FEC repair packet, a block ID that indicates a block of packets the particular packet belongs to, and a sequence #that indicates a position within the block of packet that the particular packet belongs to.

In some embodiments the FEC repair packet further includes a UDP header including a source-port field. In some embodiments the FEC trailer further includes a block ID that indicates a block of packets the particular packet belongs to, and a sequence #that indicates a position within the block of packet that the particular packet belongs to. In some embodiments the FEC repair packet further includes one or more tuning parameters in the FEC trailer.

Also disclosed are computer-implemented methods for FEC at the IP-Layer with adaptive bandwidth overhead minimization in a packet transmission network, the method including processing IP packets with an FEC encoder to generate FEC encoded packets and FEC repair packets, receiving at an FEC decoder the FEC encoded packets and FEC repair packets, and controlling with an FEC controller that comprises a set of computer-implemented instructions to cause a processor to carry out functions including configuring an FEC algorithm to control FEC encoding and decoding, packet recovery, and retrieve packet transmission statistics, determining if network bandwidth overhead needs adjustment, controlling tuning parameters, and implementing predictive analysis based at least in part on historic data.

In some embodiments the method includes adding meta-information to the FEC encoded packets with the FEC encoder. In some embodiments the method includes providing an encoding context from the FEC controller to the FEC encoder. In some embodiments the method includes providing a decoding context from the FEC controller to the FEC decoder. In some embodiments the method includes maintaining an encoding state for processing the IP-packets by the FEC encoder. In some embodiments the method includes maintaining a decoding state for processing the IP-packets by the FEC decoder.

In some embodiments the method includes controlling tuning parameters that include: (i) the number of original IP packets, (ii) the number of generated repair packets, and (iii) the on/off state of the FEC algorithm.

In some embodiments the method includes generating, with the FEC encoder, the FEC encoded packets to include an FEC block of predetermined length. In some embodiments the method includes generating, with the FEC encoder, a predetermined number of repair packets per FEC block. In some embodiments the method includes sending, with the FEC encoder, an FEC block length and the number of repair packets per FEC block via an FEC trailer. In some embodiments the method includes sending, with the FEC encoder, an FEC block length and the number of repair packets per FEC block via a port in a UDP header. Other embodiments also exist.

Figure 1:
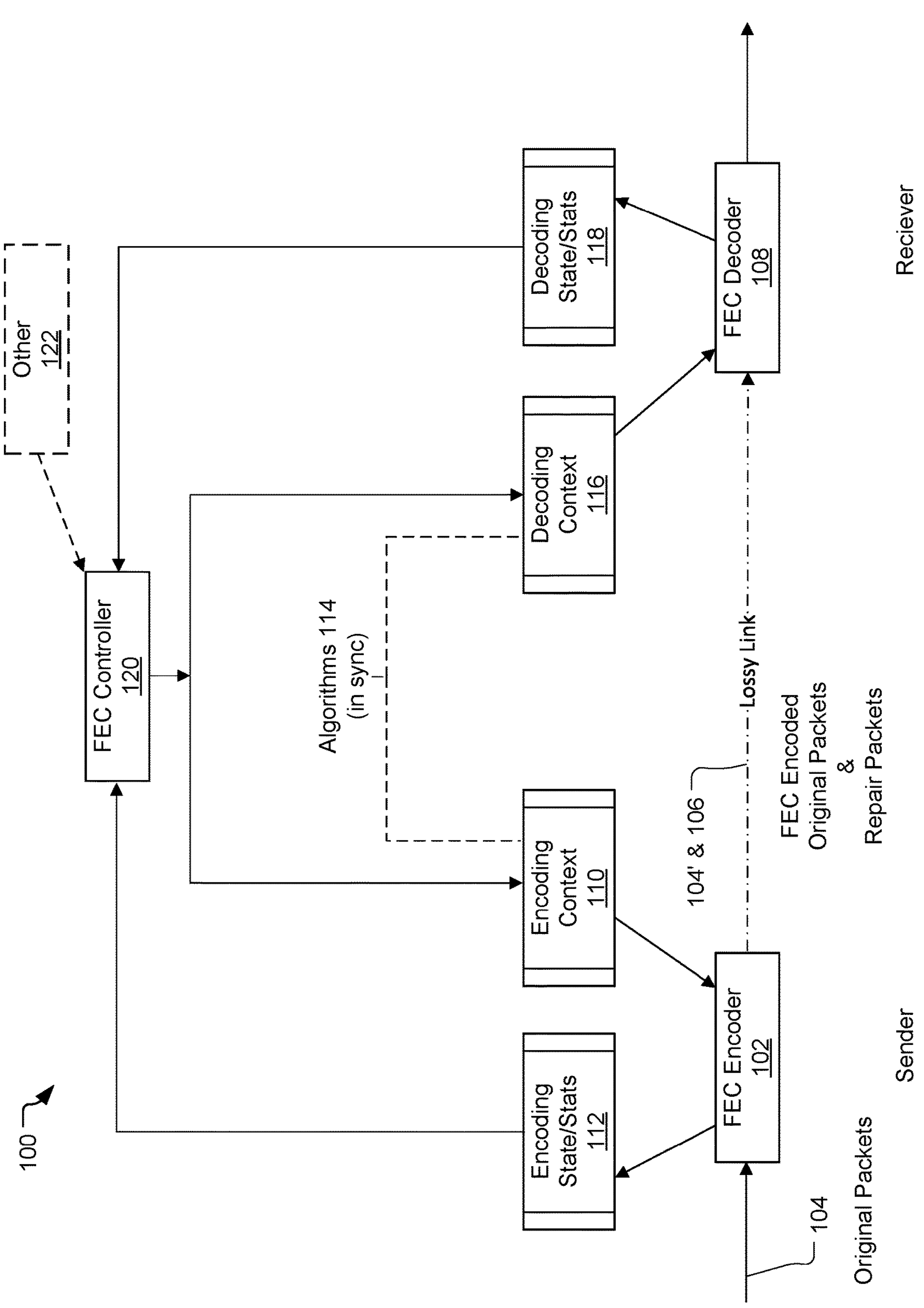
FIG. 1 is a schematic illustration of components of systems for FEC at the IP layer in accordance with disclosed embodiments.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

The general principles of FEC are known and many types of FEC algorithms exist. Also, FEC has been used over lossy mediums in a variety of applications. The usual deployment of FEC is at the application layer and is typically end-to-end.

For example, the Internet Engineering Task Force (IETF) has published requests for comments (RFCs) relating to FEC at the IP-layer such as RFC-5052, RFC-5445, RFC-6363, and RFC-8680. Of these, RFC-8680 aims to minimize bandwidth overhead due to FEC by using a sliding-window based FEC codes. Further, RFC-5052 and RFC-5445 are for applications used for sending files (i.e., content) end-to-end. None of the aforementioned proposals are adaptive given their use-case and they aren't relevant for packet forwarding systems and methods.

Likewise, RFC-6363 defines FEC for use above the transport layer and is, thus, end-to-end, however, it does not provide for adaptiveness. RFC-8680 is an update to RFC-6363 to enable use of sliding-window FEC codes. However, it, too, does not describe any method for adaptiveness in the face of varying packet loss. Other drawbacks and issues also exist with present systems and methods. In contrast, the presently disclosed embodiments provide bandwidth overhead reduction for both block FEC codes and sliding-window FEC codes.

FIG. 1 is a schematic illustration of components of systems 100 for FEC at the IP layer in accordance with disclosed embodiments. As illustrated, at the sender side an FEC encoder 102 component processes the original packets 104 for FEC to generate FEC encoded packets 104', adds any meta-information as desired at the receiver side to process the packets 104', and generates the required number of repair packets 106. The input original packets 104 to the FEC encoder 102 are IP-packets.

As illustrated schematically, an FEC encoder 102 uses encoding context 110 to perform an FEC operation on the sending side. The encoding context 110 contains the FEC algorithm 114 to use as well as any parameters needed for the FEC.

Embodiments of FEC encoder 102 may require the packet data in order to generate the repair codes. As also indicated, FEC encoder 102 also maintains the encoding state for processing (e.g., block-id to use, next sequence number to use, timestamps, etc.) and also maintains statistics related to encoding operation as indicated at 112.

As illustrated schematically, an FEC decoder 108 on the receiver side processes the received FEC processed packet 104', which could be original packet 104 with FEC meta-information (e.g., FEC encoded packet 104') or a FEC repair packet 106. If any packet loss is detected, the FEC decoder 108 invokes the FEC algorithm 114 to recover the packet. As will be understood by those of ordinary skill in the art, the recovery may or may not succeed. Again, the inputs to the FEC decoder 108 are IP-packets.

Embodiments of FEC Decoder 108 use decoding context 116 to perform FEC recovery operations at the receiving side. Embodiments of decoding context 116 contain the FEC algorithm 114 to use as well as any other parameters needed for the FEC.

Embodiments of the FEC decoder 108 may require packet data in order to perform recovery of lost packets. As also indicated, FEC decoder 108 also maintains state to perform the decode processing (e.g., current block-id, re-sequence queues, timestamps etc.) and also maintains statistics such as recovered packets, missing packets, un-recoverable packets, etc., as indicated at 118.

An FEC controller 120 is a central management component that, among other things, creates/removes the FEC encoding context 110 and decoding context 116, modifies the algorithm 114 properties and the like. Embodiments of FEC controller 120 are responsible for retrieving the statistics from both the encoding (e.g., statistics 112) and decoding (e.g., statistics 118) side and determine if the bandwidth overheads should be adjusted. For example, if there are un-recoverable packets, then system 100 increases the number of repair packets 106. Likewise, if the missing packets are less than the repair packets 106 being generated, the system 100 reduces the repair packets 106. Other embodiments and logic are possible as disclosed herein.

Figure 2:
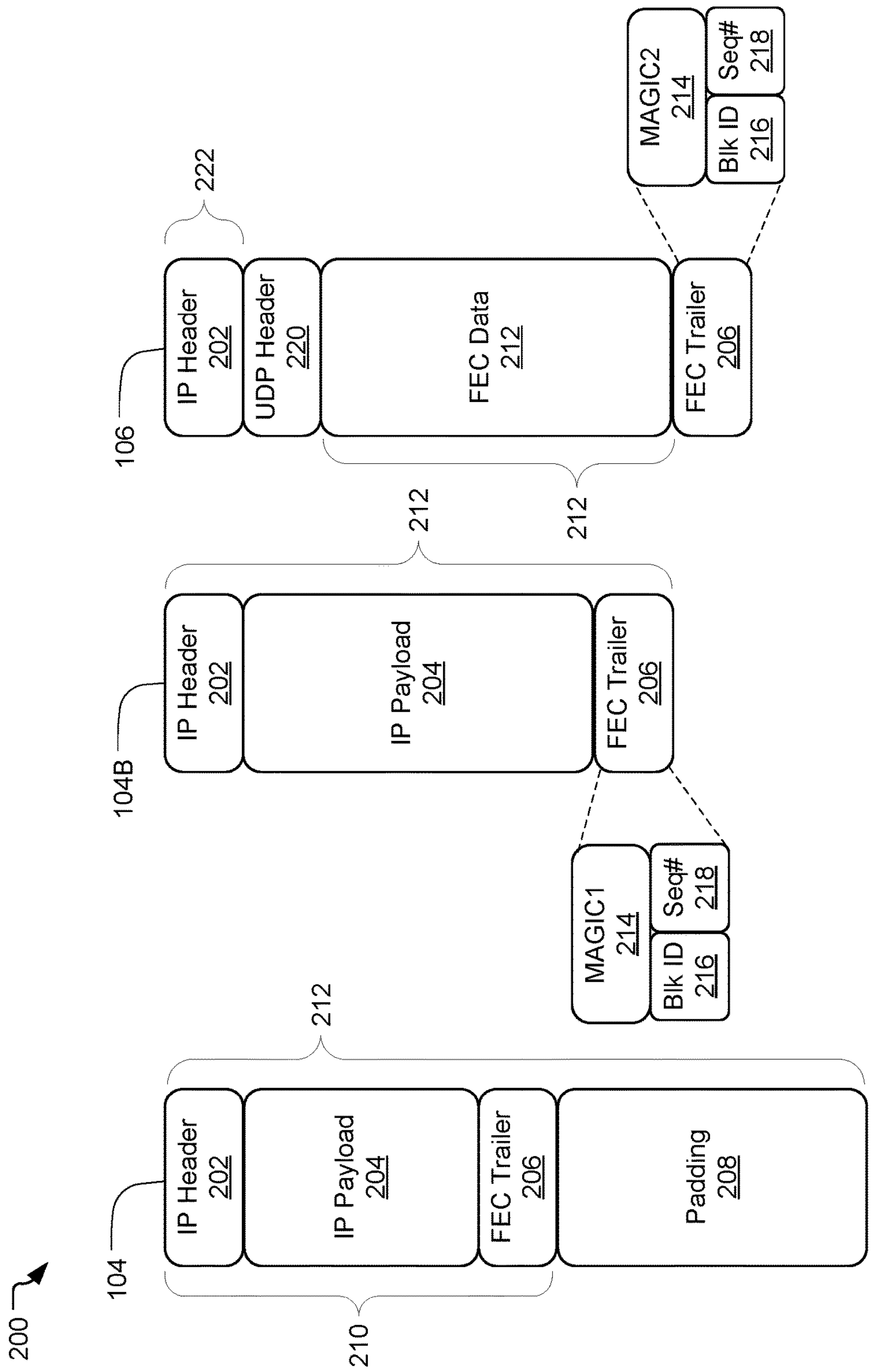
FIG. 2 illustrates FEC packet encoding which is agnostic to any specific FEC algorithm in accordance with disclosed embodiments.

FIG. 2 illustrates an FEC packet encoding system 200 that is agnostic to any specific FEC algorithm in accordance with disclosed embodiments. As part of FEC encoding processing, the FEC encoder 102 provides the packet 104 with its contents, as indicated in FIG. 2, to the FEC algorithm 114. As indicated packet 104 may comprise an FEC protected packet that is a shorter packet in an FEC block and includes an IP header 202 and an IP payload 204. The FEC encoder 102 then adds a FEC trailer 206 and adjusts the IP-header 202 length and checksum (e.g., by padding 208 with a known pattern to the length of the largest packet 104B in the FEC block 212) to account for the added length of the packet 104. The packet buffer metadata, not shown in FIG. 2, may also be suitably adjusted.

As also indicated on FIG. 2, the portion 210 of packet 104 is the portion of the packet that is sent to the remote receiver (e.g., FEC decoder 108). However, FEC encoder 102 operates over the whole packet 104 as indicated by bracket for FEC block 212.

In some embodiments, the FEC trailer 206 comprises the following components, a MAGIC #214 (e.g., MAGIC1, MAGIC2, etc.) that indicates if the packet is an original packet 104 or a repair packet 106, a Block-ID 216 that indicates which block of packets the given packet belongs to, and a Sequence #218 that indicates the position within the block of packets the given packet belongs to.

Embodiments maintain a notion of block (e.g., FEC block 212), irrespective of whether the particular FEC algorithm 114 is a block FEC algorithm, a sliding window FEC algorithm, or some other variant. An FEC block 212 defines the number of original packets 104 and the number of repair packets 106. Once a FEC block 212 is in processing, no changes are made to the FEC algorithm 114 parameters. Any changes to adjust the repair packets 106 to generate is performed in the next block (e.g., a subsequent FEC Block 212).

As will be apparent to those of skill in the art having the benefit of this disclosure, the notion of the FEC block 212 does not limit implementation using a sliding-window FEC code. What matters is how a “sliding-window FEC algorithm implementation” views the arrival of the original packets 104 and the repair packets 106. The FEC block 212 notion need not be known to a sliding-window FEC algorithm 114.

Since the sender (e.g., FEC encoder 102 where FEC encoding is done) generates the repair packets 106, the receiver (e.g., FEC decoder 108) needs to be aware whenever the algorithm 114 properties change. This signaling is done via the source-port field of the UDP header 220 added to the repair packets 106 of the FEC block 212. IP header 202 of repair packet 106 (indicated with bracket 222 on FIG. 2) has the same source/destination-IP as the FEC protected packet (e.g., packet 104'). Embodiments of UDP header 220 may comprise a dummy header to make the FEC data 212 middle box safe. Note that in some embodiments the FEC recovery may be done only when at least one repair packet 106 is available, in which case sending the information in the repair packet 106 and not in the FEC trailer 206 of the original packets 104, may suffice.

Embodiments of FEC algorithms 114 may require some “mathematical state” to be maintained at the FEC encoder 102 and FEC decoder 108. In some block FEC algorithms, such as Reed-Solomon, the state is based on the number of original packets 104 and repair packets 106 in an FEC block 212. This means a huge set of state combinations are possible. In such situations, and to allow variability of the parameters for adaptiveness, the solution can ensure that only a few selected combinations of the two parameters can be supported. This ensures that the receiver (FEC decoder 108) tunes itself automatically while still not requiring a large memory for maintaining all possible combinations of the “mathematical state.”

As will be apparent, FEC controller 120 essentially controls three tuning parameters 224 (shown schematically in FIG. 3) (other than any algorithm 114 specific parameters): (i) number of original packets 104, (ii) number of repair packets 106, and (iii) turning FEC on/off. Embodiments of FEC controller 120 may get information from the encoding states 112 and decoding states 118, as shown schematically in FIG. 1 and also from other components 122 of system 100 such as “QoE monitoring” components, “user inputs” components, or the like. For example, in some embodiments, a “QoE monitoring” component (e.g., one exemplary other component 122) may provide FEC controller 120 with information such as actual bandwidth, utilization, etc., and a user input component may provide target maximum FEC overhead in terms of percentage of link bandwidth, or the like. Other components 122 may also be in communication with FEC controller 120.

Embodiments of FEC controller 120 may correlate loss/recovery rates across multiple FEC encode 110/decode 116 contexts. For example, when different contexts 110, 116 are used for different types of traffic between the same sender (e.g., FEC encoder 102) and the same receiver (e.g., FEC decoder 108), the contexts 110, 116 may be amended such that more important traffic types are given priority FEC handling over other traffic types. Thus, while the bandwidth overhead per FEC context 110, 116 may be more, overall, on the lossy link between the sender and receiver, the FEC overhead may be reduced and, thereby, still meet any user set threshold.

Using these various sources of information, FEC controller 120 maintains a history of data and uses it for predictive analysis. In some embodiments, predictive analysis by FEC controller 120 may adjust the traffic parameters pro-actively to compensate for any trend towards more packet loss, less packet loss, or other conditions. For example, if the data collected over a period indicates increasing packet loss, the FEC controller 120 may add more repair packets 106. Likewise, a trend indicating reducing losses may be used to reduce the repair packets 106 per FEC block 212. Such adjustments lead to faster system 100 response to many predictable loss situations.

Embodiments of FEC controller 120 may also ensure that certain minimum number of repair packets 106 are always maintained in order to respond to unpredictable and bursty loss situations or the like. In some embodiments, if the FEC controller 120 determines that there has been no loss for a predetermined period of time, it may disable the FEC. Other embodiments are also possible.

Figure 3:
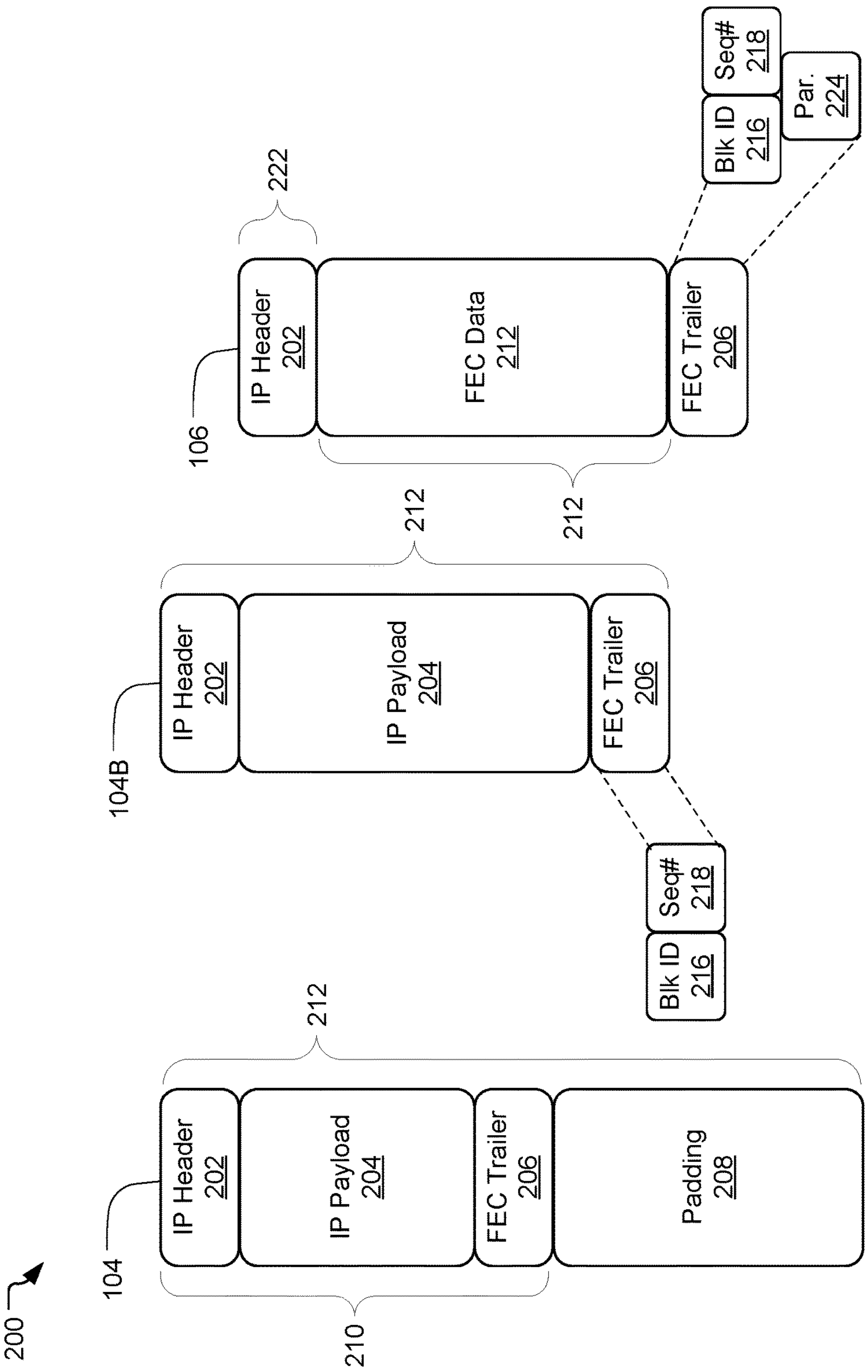
FIG. 3 illustrates another FEC packet encoding system that is agnostic to any specific FEC algorithm in accordance with disclosed embodiments.

FIG. 3 illustrates another FEC packet encoding system 300 that is agnostic to any specific FEC algorithm in accordance with disclosed embodiments. As shown in this embodiment, MAGIC #214 field may be omitted in the FEC trailer 202. In these embodiments, based on packet 104 size difference between IP-header 202 and overall packet 104 size (e.g., as known from the device driver or the like), system 300 may detect the presence of FEC trailer 206. Additionally, in some embodiments the IP-protocol field in the IP Header 202 (e.g., repair packet 106 IP header indicated at 222) may be used to indicate a repair packet 106. As also indicated in FIG. 3, in some embodiments the UDP header 220 in repair packets 106 may be omitted and instead the FEC algorithm 114 tuning parameters 224 may be part of FEC trailer 206, in addition to blk-id 216 and seq #218. Other embodiments are also possible.

Although various embodiments have been shown and described, the present disclosure is not so limited and will be understood to include all such modifications and variations would be apparent to one skilled in the art.

What is claimed is:

1. A computer-implemented system for Forward Error Correction (FEC) at the IP-Layer with adaptive bandwidth overhead minimization in a packet transmission network, the system comprising:

an FEC encoder to process IP packets and generate FEC encoded packets and repair packets, wherein the FEC encoder adds meta-information to the FEC encoded packets;

an FEC decoder to receive and process the FEC encoded packets and repair packets; and an FEC controller that comprises a set of computer-implemented instructions to cause a processor to carry out functions comprising:

configuring an FEC algorithm to control FEC encoding and decoding, packet recovery, and retrieve packet transmission statistics;

determining if network bandwidth overhead needs adjustment;

controlling tuning parameters that further comprise:

(i) the number of original IP packets;

(ii) the number of generated repair packets; and (iii) the on/off state of the FEC algorithm; and implementing predictive analysis based at least in part on historic data.

2. The computer-implemented system of claim 1 wherein the FEC encoder uses an encoding context provided by the FEC controller.

3. The computer-implemented system of claim 1 wherein the FEC decoder uses a decoding context provided by the FEC controller.

4. The computer-implemented system of claim 1 wherein the FEC encoder maintains an encoding state for processing the IP-packets.

5. The computer-implemented system of claim 1 wherein the FEC decoder maintains a decoding state for processing the IP-packets.

6. The computer-implemented system of claim 1 wherein the FEC encoder generates the FEC encoded packets to include an FEC block of predetermined length.

7. The computer-implemented system of claim 6 wherein the FEC encoder generates a predetermined number of repair packets per FEC block.

8. The computer-implemented system of claim 1 wherein the FEC encoder sends an FEC block length and the number of repair packets per FEC block via an FEC trailer.

9. The computer-implemented system of claim 1 wherein the FEC encoder sends an FEC block length and the number of repair packets per FEC block via a port in a UDP header.

10. A computer-implemented system for Forward Error Correction (FEC) at the IP-Layer, the system comprising:

an FEC encoder to process IP packets and generate FEC repair packets and FEC encoded packets that further comprise an FEC trailer, wherein the FEC encoder adds meta- information to the FEC encoded packets;

an FEC decoder to receive and process the FEC encoded packets and FEC repair packets;

an FEC controller that controls an FEC algorithm for the FEC encoder and FEC decoder; and wherein the FEC repair packet further comprises one or more tuning parameters comprising:

(i) the number of original IP packets;

(ii) the number of generated repair packets; and (iii) the on/off state of the FEC algorithm in the FEC trailer.

11. The computer-implemented system for FEC at the IP-Layer of claim 10 wherein the FEC trailer further comprises:

a MAGIC #that indicates whether a particular packet is an FEC encoded packet or an FEC repair packet;

a block ID that indicates a block of packets the particular packet belongs to; and a sequence #that indicates a position within the block of packet that the particular packet belongs to.

12. The computer-implemented system for FEC at the IP-Layer of claim 10 wherein the FEC repair packet further comprises:

a UDP header comprising a source-port field.

13. The computer-implemented system for FEC at the IP-Layer of claim 10 wherein the FEC trailer further comprises:

a block ID that indicates a block of packets the particular packet belongs to; and a sequence #that indicates a position within the block of packet that the particular packet belongs to.

14. A computer-implemented method for Forward Error Correction (FEC) at the IP-Layer with adaptive bandwidth overhead minimization in a packet transmission network, the method comprising:

processing IP packets with an FEC encoder to generate FEC encoded packets and FEC repair packets;

adding meta-information to the FEC encoded packets with the FEC encoder;

receiving at an FEC decoder the FEC encoded packets and FEC repair packets; and controlling with an FEC controller that comprises a set of computer-implemented instructions to cause a processor to carry out functions comprising:

configuring an FEC algorithm to control FEC encoding and decoding, packet recovery, and retrieve packet transmission statistics;

determining if network bandwidth overhead needs adjustment;

controlling tuning parameters that further comprise:

(i) the number of original IP packets;

(ii) the number of generated repair packets; and (iii) the on/off state of the FEC algorithm; and implementing predictive analysis based at least in part on historic data.

15. The computer-implemented method of claim 14 further comprising providing an encoding context from the FEC controller to the FEC encoder.

16. The computer-implemented method of claim 14 further comprising providing a decoding context from the FEC controller to the FEC decoder.

17. The computer-implemented method of claim 14 further comprising maintaining an encoding state for processing the IP-packets by the FEC encoder.

18. The computer-implemented method of claim 14 further comprising maintaining a decoding state for processing the IP-packets by the FEC decoder.

19. The computer-implemented method of claim 14 further comprising generating, with the FEC encoder, the FEC encoded packets to include an FEC block of predetermined length.

20. The computer-implemented method of claim 19 further comprising generating, with the FEC encoder, a predetermined number of repair packets per FEC block.

21. The computer-implemented method of claim 14 further comprising sending, with the FEC encoder, an FEC block length and the number of repair packets per FEC block via an FEC trailer.

22. The computer-implemented method of claim 14 further comprising sending, with the FEC encoder, an FEC block length and the number of repair packets per FEC block via a port in a UDP header.

* * * * *